US005396593A

United States Patent [19]

Mori et al.

[11] Patent Number: 5,396,593

[45] Date of Patent: Mar. 7, 1995

[54] DATA PROCESSING APPARATUS

[75] Inventors: Masaya Mori, Yamoto; Yutaka Morimoto, Machida, both of Japan

[73] Assignee: International Business Machines Corporation, Armonk, N.Y.

[21] Appl. No.: 195,610

[22] Filed: Feb. 14, 1994

Related U.S. Application Data

[63] Continuation of Ser. No. 610,863, Nov. 8, 1990, abandoned.

[30] Foreign Application Priority Data

Nov. 10, 1989 [JP] Japan .................................... 291399

[51] Int. Cl.[6] .............................................. G06F 15/62

[52] U.S. Cl. .................................................... 395/162

[58] Field of Search ............... 395/162, 163, 118, 128, 395/164, 165, 166; 345/132, 205, 214

[56] References Cited

U.S. PATENT DOCUMENTS 5,072,411 12/1991 Yamaki .............................. 395/162

OTHER PUBLICATIONS

Sherr, "Electronic Displays", 1979, John & Willey & Sons, pp. 418–425.

*Primary Examiner*—Phu K. Nguyen

*Attorney, Agent, or Firm*—Mark S. Walker; William A. Kinnaman, Jr.

[57] ABSTRACT

Data processing apparatus including a display monitor operable in response to a display signal of predetermined frequency and a computer for transmitting a display signal to the display monitor. The display monitor generates an identifier signal indicating the predetermined frequency at which the display monitor operates. The computer means uses the identifier signal to determine the frequency of the display signal.

11 Claims, 2 Drawing Sheets

DATA PROCESSING APPARATUS

This is a continuation of application Ser. No. 07/610,863, filed Nov. 8, 1990, abandoned.

FIELD OF THE INVENTION

The present invention relates to a data processing apparatus having data display means and data processing means and, more particularly, to a configuration for changing the frequency of synchronous data and control signals fed from the data processing means to the data display means in response to the requirement of the data display means.

DESCRIPTION OF THE RELATED ART

There are cases in which signals are provided from data processing means such as a personal computer to a data display means such as a cathode ray tube (CRT) monitor and a liquid crystal display (LCD) monitor, etc., at a frequency determined by the data processing means, but the frequency (operating frequency) of the signals at which the data display means can properly operate varies with the type and specifications of the data display meander. For example, some CRT monitors can properly operate only at 47 MHz, while other CRT monitors can operate only at 58 MHz. In this situation, in order to operate the 47 MHz CRT monitor, the frequency of data signals and control signals provided from the data processing means should be set at 47 MHz, but in order to operate the 58 MHz CRT monitor, the frequency of data signals and control signals provided from the data processing means should be set at 58 MHz.

Accordingly, when the connection to the data processing means from a CRT monitor adapted for use at a certain operating frequency is changed to another CRT monitor adapted for use at a different operating frequency, the other CRT monitor cannot be operated, unless the frequency (transfer frequency) of data signals and control signals transferred from the data processing means is changed.

In the prior art, in order to change the frequency of the signals from the data processing means, an operator had to manually operate switch means such as a did switch installed in the data processing means. This manual operation is inconvenient and tends to cause mistakes.

An object of the invention is to provide a data processing apparatus which, when a data display means such as a CRT monitor is connected to a data processing means, data signals and control signals with a frequency at which said data display means properly operates are provided from the data processing means to said data display; means, without any manual operation of switches.

SUMMARY OF THE INVENTION

The present invention is intended to achieve said object by providing a data display means with identifier signal generating means for generating a signal for identifying the frequency at which said data display means properly operates, and also providing a data processing means with frequency deciding means for deciding, in response to said identifier signal, the frequency of the synchronous signals to be provided to said data display means.

DESCRIPTION OF THE PREFERRED EMBODIMENT

Figure 1:
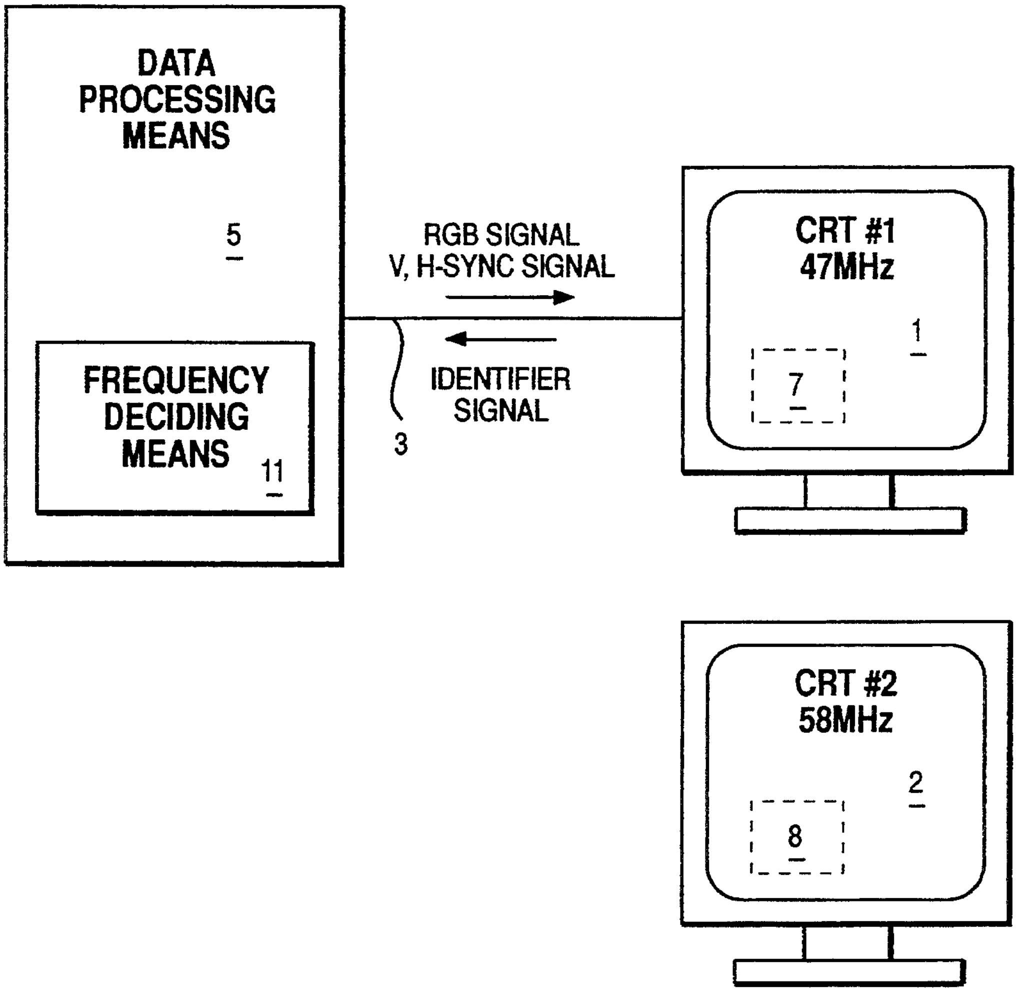
FIG. 1 is a block diagram showing the overall configuration of an embodiment of a data processing apparatus according to this invention.

FIG. 1 shows the overall configuration of an embodiment of a data processing apparatus according to the invention. In the figure, first and second CRT monitors 1 and 2 as data display means are adapted for use at operating frequencies differing from each other, the operating frequency of the first CRT monitor 1 being 47 MHz and that of the second CRT monitor 2 being 58 MHz. That is to say, for the first CRT monitor 1 to operate properly, a display signal comprising data signals and control signals must be provided at a frequency of 47 MHz, and for the second CRT monitor 2 to operate properly, the display signal must be provided at a frequency of 58 MHz.

The CRT monitors 1 and 2 have identifier signal generating means 7 and 8, respectively. The means 7 and 8 generate signals for identifying the operating frequencies of the monitors 1 and 2, respectively. In this embodiment, identification of the two CRT monitors is required and, therefore, one bit is enough for the bit pattern of the identifier signal. The bit pattern of the identifier signal from the means 7 of the first CRT monitor 1 is "1", while the bit pattern of the identifier signal from the means 8 of the second CRT monitor 2 is "0". These identifier signals are continuously outputted while the power switches of the CRT monitors 1 and 2 are on.

As the first CRT monitor 1 is connected to the data processing means 5 through a cable 3, an identifier signal with its bit pattern of "1" is provided from the first CRT monitor 1 to the data processing means 5 and, then, RGB signals (picture signals) as the data signals and a horizontal synchronization signal (H-SYNC signal) and a vertical synchronization signal (V-SYNC signal) as control signals are provided from the data processing means 5 to the first CRT monitor 1. The data processing means 5 has frequency deciding means 11. The means 11 decides the frequency of the signals to be transferred in response to said identifier signal and, then, the data processing means 5 provides the signals to the CRT 1 at the frequency determined by the frequency deciding means 11.

Figure 2:
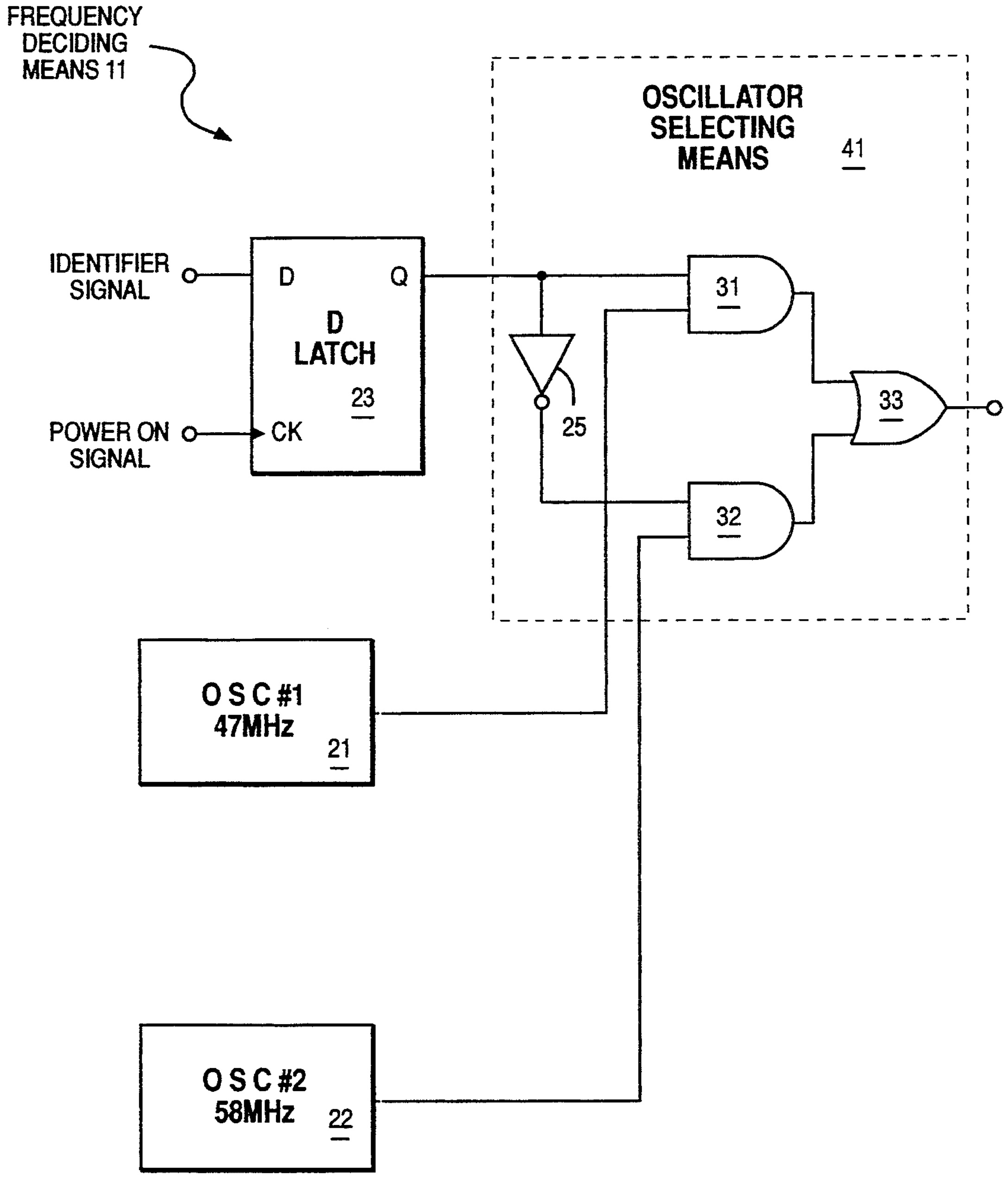
FIG. 2 is a block diagram showing frequency deciding means of the embodiment shown in FIG. 1.

FIG. 2 shows the construction of the frequency deciding means 11.

The frequency deciding means 11 has a first oscillator 21 for generating a signal at a 47 MHz frequency, a second oscillator 22 for generating a signal at a 58 MHz frequency, and latching means 23. The latching means 23 is, for example, a delayed-type (D-type) latch, the data terminal D of which receives the identifier signal generated by the identifier signal generating means 7 or 8 of the data display means 1 or 2 and the clock terminal CK of which receives a signal "1" (H level signal) while the power switch of the data processing means 5 is on. An output terminal Q of the latching means 23 is connected to one of the input terminals of a first AND gate 31, while the first oscillator 21 is connected to the other input terminal of the first AND gate 31. The output terminal Q of the latching means 23 is also connected to one of the input terminals of a second AND gate 32 through an inverter 25, while the second oscillator 22 is connected to the other input terminal of the second AND gate, and the output terminals of the AND gates 31 and 32 are connected to the respective input terminals of an OR gate 33. Here, an oscillator selecting means 41 is configured as a logical gate means consisting of the inverter 25, the first AND gate 31, the second AND gate 32 and the OR gate 33.

Next, the operation of the frequency deciding means 11 is described.

Since the first CRT monitor 1 is connected to the data processing means 5, the identifier signal with the bit pattern "1" generated by the first CRT monitor 1 is inputted to the data terminal-D of the latching means 23; then, at the output Q of the latching means 23, the same signal "1" as the input signal to the data terminal D emerges, and at the output side of the inverter 25 a signal "0" emerges. Accordingly, at the output terminal of the OR gate 33, a clock signal with a frequency of 47 MHz, which is the oscillation frequency of the first oscillator 21, emerges; a signal with a frequency of 47 MHz is thus generated by the oscillator selecting means 41 and hence, accordingly, by the frequency deciding means 11. As the frequency deciding means 11 generates the 47 MHz frequency signal, the data processing means 5 provides the RGB and H- and V-SYNC signals to the first CRT monitor 1 at a frequency of 47 MHz. As a result, the first CRT monitor 1 adapted for use at an operating frequency of 47 MHz operates properly in response to said RGB and H- and V-SYNC signals.

Next, operation of this equipment with the second CRT monitor 2 connected to the data processing means 5, in place of the first CRT monitor 1, is described.

In this instance, the data terminal D of the latching means 23 receives an identifier signal of "0" bit pattern generated by the second CRT monitor 2. Then at the output Q of the latching means 23, the same signal "0" as the input signal to the data terminal D emerges, and at the output side of the inverter 25 a signal "1" emerges. Accordingly, at the output terminal of the OR gate 33 emerges a signal with a frequency of 58 MHz, which is the frequency of the second oscillator 22. As a consequence, the oscillator selecting means 41 (and accordingly, the frequency deciding means 11), generates signals with the frequency of 58 MHz. As the frequency deciding means 11 generates signals with the frequency of 58 MHz, the data processing means 5 provides the RGB and H- and V-SYNC signals to the second CRT monitor 2 at a frequency of 58 MHz. As a result, the second CRT monitor 2 adapted for use at an operating frequency of 58 MHz operates properly in response to said RGB and H- and V-SYNC signals.

Since a signal "1" is being inputted to a clock terminal CK of the latching means 23 while the power switch of the data processing means 5 is on, the former identifier signal is latched in the latching means 23, even if the identifier signal is not provided from the CRT monitor 1 or 2 to the data processing means 5 for a period, for example if the connection between the data processing means 5 and the CRT monitor 1 or 2 is accidentally broken. Therefore, the frequency deciding means 11 continuously generates the signal with the former frequency, so that even if the identifier signal is temporarily not provided, data signals and control signals can be transferred to the CRT monitor 1 or 2 at the proper frequency.

According to such an embodiment, the frequency matched to the operating frequency of the CRT monitor 1 or 2 can be automatically selected by the data processing means 5 merely by connecting the CRT monitor 1 or 2 to the data processing means 5, thus the need for manual operation of any switches is eliminated.

Besides, since the oscillator selecting means 41 is configured as a logical gate means, the selection of frequency can be made merely by adding a simple hardware configuration.

Note that in the above embodiment, the data display means are assumed to be CRT monitors, but they are not limited to CRT monitors. Other types of data display means such as LCD, plasma display, etc., may be employed. In the above embodiment, either of the two CRT monitors is connected to the data processing means through a reconnectable cable, but the data processing means may have such a flat display means as LCD or plasma display, etc., inseparably connected and can select the frequency matched to the operating frequency of the CRT monitor connected to its outside terminal, in place of the frequency which has been matched to the operating frequency of the LCD or plasma display. Besides, the type of the identifier signal and the number of data display means to be identified are not limited to those of said embodiment, but a larger number of different frequencies may be selected based on a larger number of identifier signals. Further, in said embodiment, the frequency is determined from the identifier signal with use of a simple hardware configuration of logical gate means configured of a small number of gates, but the frequency may be selected by inputting the identifier signal to a microprocessor (MPU), to have the microprocessor discern the identifier signal. Furthermore, a further simplified configuration sparing the use of the latching means (D latch) may be used.

As described in the foregoing, this invention makes it possible to provide a data processing apparatus which enables signals to be provided from a data processing means to one of data display means like CRT monitors, etc., at a frequency at which the data display means is adapted to operate in response to these signals, merely by connecting the data display means to the data processing means, without requiring any manual operation.

We claim:

1. Data processing apparatus including:

display means operable in response to a display signal of predetermined frequency to display graphics image, said display means having at least a refresh rate and a display resolution which together define said predetermined frequency, said display means also having identifier means for generating an identifier signal indicating said predetermined frequency; and data processing means for transmitting said display signal to said display means at a selectable transmission frequency, said data processing means having frequency deciding means for selecting said selectable transmission frequency to equal the predetermined frequency of said display signal in response to said identifier signal.

2. Apparatus as in claim 1 in which said frequency deciding means comprises:

a plurality of oscillators different in oscillation frequency from one another; and an oscillator selecting means connected to said oscillators for selecting one of said oscillation frequencies in response to said identifier signal.

3. Apparatus as in claim 2 in which said oscillator selecting means comprises a logic gate means for selecting and outputting only one of the output signals from said plurality of oscillators in response to said identifier signal.

4. Apparatus as in claim 2 in which said oscillator selecting means includes a microprocessor.

5. Apparatus as in claim 1 in which said frequency deciding means includes latching means for latching said identifier signal.

6. A display device for a computer system comprising:

display means for generating a graphic display in response to a display signal of predetermined frequency, said display means having at least a refresh rate and a display resolution that together define said predetermined frequency; and identifier means for generating an identifier signal indicative of said predetermined frequency.

7. A data processing system including a processor and memory for processing data and generating output in the form of a display signal at an output display signal frequency, said data processing system comprising:

means for receiving a signal indicative of a predetermined display device signal frequency, said display device signal frequency identifying at least a display resolution and display refresh rate; and frequency deciding means for setting the output display signal frequency as the frequency received by the means for receiving.

8. The system of claim 7 in which said frequency deciding means comprises:

a plurality of oscillators different in oscillation frequency from one another; and an oscillator selector means connected to said oscillators for selecting one of said oscillation frequencies in response to said means for receiving.

9. The system of claim 8 in which said oscillator selector means comprises:

logical gate means for selecting and outputing only one of the output signals from said plurality of oscillators in response to said means for receiving.

10. The system of claim 9 in which said oscillator selected means comprises a microprocessor.

11. The system of claim 7 in which said frequency deciding means includes latching means for latching the signal received by the means for receiving.

* * * * *

UNITED STATES PATENT AND TRADEMARK OFFICE
CERTIFICATE OF CORRECTION

PATENT NO. : 5,396,593

DATED : March 7, 1995

INVENTOR(S) : Masaya Mori and Yutaka Morimoto

It is certified that error appears in the above-indentified patent and that said Letters Patent is hereby corrected as shown below:

Col. 1, line 25, delete "meander" and insert --means--;
line 46, delete "did" and insert --dip--;
line 56, delete "display," and insert --display--;
Col. 2, line 6, after "showing" insert --a--; and
Col. 3, line 15, delete "terminal-D" and insert --terminal D--.

Signed and Sealed this

Twenty-eighth Day of May, 1996

Attest:

BRUCE LEHMAN

Attesting Officer

Commissioner of Patents and Trademarks